(12) United States Patent
Dakowski et al.

(10) Patent No.: US 7,520,135 B2
(45) Date of Patent: Apr. 21, 2009

(54) VARIABLE-SECTION TURBOMACHINE NOZZLE

(75) Inventors: Mathieu Dakowski, Sucy en Brie (FR); Guy Lapergue, Rubelles (FR); Romain Lunel, Moissy Cramayel (FR); Guillaume Sevi, Ivry sur Seine (FR)

(73) Assignee: SNECMA, Paris (FR)

( * ) Notice: Subject to any disclaimer, the term of this patent is extended or adjusted under 35 U.S.C. 154(b) by 518 days.

(21) Appl. No.: 11/248,330

(22) Filed: Oct. 13, 2005

(65) Prior Publication Data

US 2006/0090470 A1 May 4, 2006

(30) Foreign Application Priority Data

Oct. 29, 2004 (FR) .................................. 04 11574

(51) Int. Cl.
*F02K 1/12* (2006.01)
(52) U.S. Cl. ..................................... 60/771; 239/265.39
(58) Field of Classification Search .................. 60/230, 60/770, 771; 239/265.37, 265.39
See application file for complete search history.

(56) References Cited

U.S. PATENT DOCUMENTS 5,232,158 A * 8/1993 Barcza .................. 239/265.39

FOREIGN PATENT DOCUMENTS

| EP | 1 333 172 A1 | 8/2003 |
| FR | 2 857 414 | 1/2005 |
| JP | 2003-56404 | 2/2003 |

OTHER PUBLICATIONS

U.S. Appl. No. 11/248,330, filed Oct. 13, 2005, Dakowski et al.
U.S. Appl. No. 11/248,329, filed Oct. 13, 2005, Dakowski et al.

* cited by examiner

*Primary Examiner*—Louis J Casaregola
(74) *Attorney, Agent, or Firm*—Oblon, Spivak, McClelland, Maier & Neustadt, P.C.

(57) ABSTRACT

A variable-section turbomachine nozzle comprises a plurality of moving flaps, and a moving flap control system comprising control levers each associated with a respective moving flap, the control levers comprising both controlled levers that are actuated directly by actuators, and follower levers that are actuated by the controlled levers via transmission links. When the nozzle is at rest, the flaps associated with the follower levers present a radial offset relative to the flaps associated with the controlled levers.

11 Claims, 2 Drawing Sheets

VARIABLE-SECTION TURBOMACHINE NOZZLE

BACKGROUND OF THE INVENTION

The present invention relates to the general field of variable-section nozzles for turbomachines, and more particularly it relates to nozzles made up of a plurality of moving flaps forming a ring.

In a conventional architecture for a turbomachine nozzle of variable section, the nozzle is constituted in particular by a ring of moving flaps that are mounted to extend an annular casing of the turbomachine.

The moving flaps are actuated by a control system so as to modify the profile of the primary stream of the turbomachine (i.e. its exhaust section). Depending on the intended configuration, the control system comprises one or more control actuators associated with a more or less complex linkage, e.g. making use of control levers and swivelling-fork connections.

The present invention relates more precisely to a variable-section nozzle of the type in which the control levers for the moving flaps comprise both controlled levers that are actuated directly by actuators, and follower levers that are not actuated directly by actuators but by the controlled levers by means of the swivel-fork connections that transmit displacement drive to the flaps.

With this type of variable-section nozzle, it has been found that in operation (and in particular when the turbomachine fitted with such a nozzle is operating at full speed), not all of the moving flaps making up the ring lie on the same diameter. As a result, while the nozzle is in operation, large leaks occur between adjacent flaps which are due to offsets in the pivoting of the various moving flaps. Such leaks are particularly harmful to the performance of the turbomachine (thrust, specific consumption, etc.).

OBJECT AND SUMMARY OF THE INVENTION

A main object of the invention is thus to mitigate such drawbacks by proposing a variable-section nozzle enabling leaks between adjacent flaps to be decreased in operation, thereby improving the performance of the turbomachine fitted with such a nozzle.

To this end, the invention provides a variable-section turbomachine nozzle comprising a plurality of moving flaps, and a moving flap control system comprising control levers each associated with a respective moving flap, the control levers comprising both controlled levers that are actuated directly by actuators, and follower levers that are actuated by the controlled levers via transmission links, wherein, when the nozzle is at rest, the flaps associated with the follower levers present a radial offset relative to the flaps associated with the controlled levers.

With such a radial offset between the different types of flap, when the nozzle is in operation, the moving flaps forming the ring of the nozzle are to be found on a common diameter and any risk of leakage between adjacent flaps is thus avoided. This modification to the nozzle also remains simple and inexpensive.

According to a particular characteristic of the invention, when the nozzle is at rest, the moving flaps associated with the follower levers present a radial offset towards the inside of the nozzle relative to the moving flaps associated with the controlled levers.

According to another particular characteristic of the invention, the radial offset of the moving flaps associated with the follower levers is obtained by modifying the machining of said follower levers.

The control system for the moving flaps may comprise as many controlled levers as it comprises follower levers.

The present invention also provides a turbomachine fitted with a variable-section nozzle as defined above.

BRIEF DESCRIPTION OF THE DRAWINGS

Other characteristics and advantages of the present invention appear from the following description given with reference to the accompanying drawings which show an embodiment that has no limiting character. In the figures.

DETAILED DESCRIPTION OF AN EMBODIMENT

Figure 1:
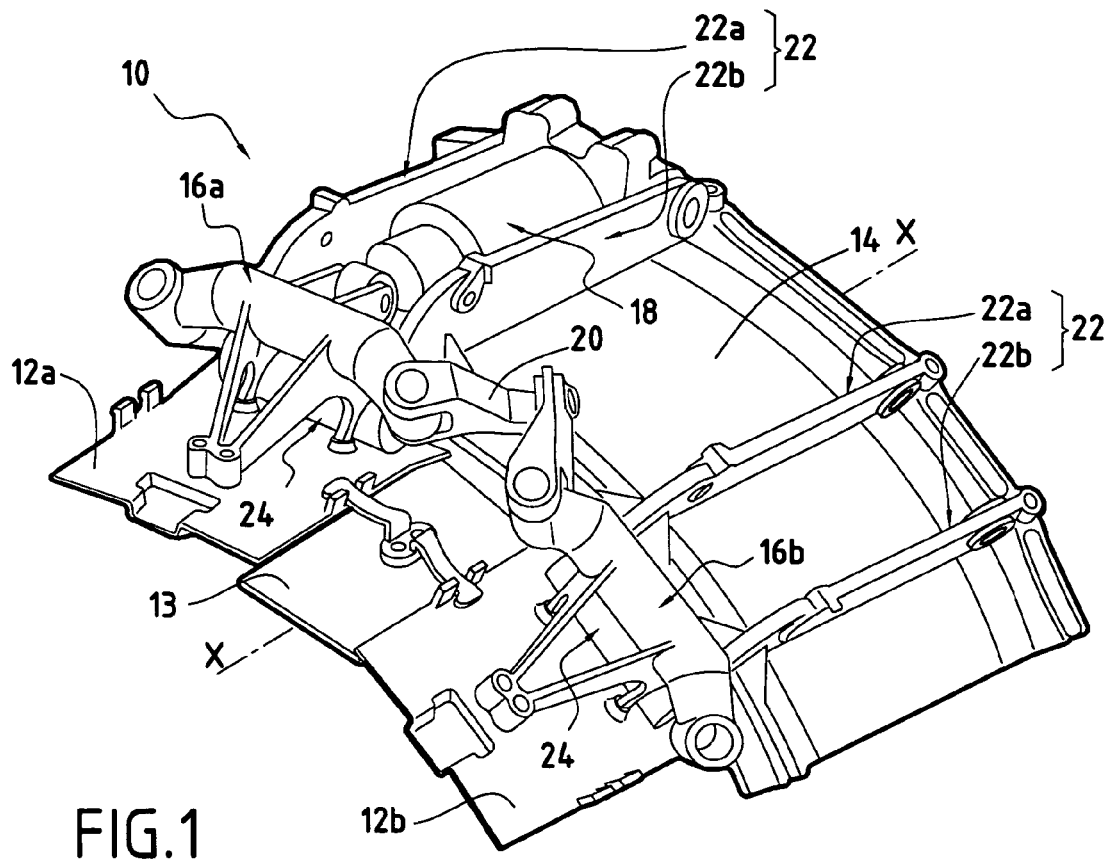
FIG. 1 is a fragmentary perspective view of a variable-section nozzle of the invention.

FIG. 1 shows a portion of a variable-section turbomachine nozzle 10 of the invention.

The nozzle 10 of axis X-X comprises in particular a plurality of controlled moving flaps 12a and 12b and follower moving flaps 13 which are mounted on a downstream end of an annular casing 14 of the turbomachine that is centered on the axis X-X. The controlled flaps 12a and 12b and the follower flaps 13 thus form a ring.

The controlled moving flaps 12a, 12b are actuated directly by a control system so as to change the profile of the primary stream from the turbomachine (i.e. its exhaust section).

The control system for controlled flaps 12a, 12b comprises control levers 16a, 16b each associated with a respective moving flap 12a, 12b, and at least one actuator 18 for actuating the control levers. Each control lever 16a, 16b is secured to the moving flap 12a, 12b that it controls.

More particularly, in the example of FIG. 1, a single actuator 18 serves to actuate two control levers 16a, 16b simultaneously. The actuator 18 acts directly on a first control lever, referred to as the controlled lever 16a, and indirectly on a second control lever, referred to as a follower lever 16b, via a transmission link 20 of the swivelling-fork type interconnecting the follower lever 16b and the controlled lever 16a.

As a result, the system for controlling the moving flaps has as many controlled control levers 16a as it has follower control levers 16b. When the nozzle is made up of a ring of ten controlled flaps 12a, 12b, for example, then five actuators 18 suffice to actuate all of the moving flaps.

Naturally, other configurations are possible. For example, it is possible to imagine a single actuator actuating more than two control levers together, the follower control levers being actuated via transmission links.

The follower flaps 13 are disposed radially inside the controlled flaps 12a and 12b and bear against the adjacent controlled flaps. They thus serve to provide continuity and leak-proofing for the primary stream while the nozzle is in operation and regardless of the section of its opening.

It should be observed that the nozzle also comprises a plurality of supports for the respective control levers 16a, 16b.

Such supports 22 are in the form of pairs of arms or splints 22a, 22b extending substantially parallel to each other and along the axis X-X of the nozzle. These arms 22a, 22b are secured firstly to the casing 14 at their upstream ends, and secondly to the control levers 16a, 16b at their downstream ends via spools 24.

Figure 2:
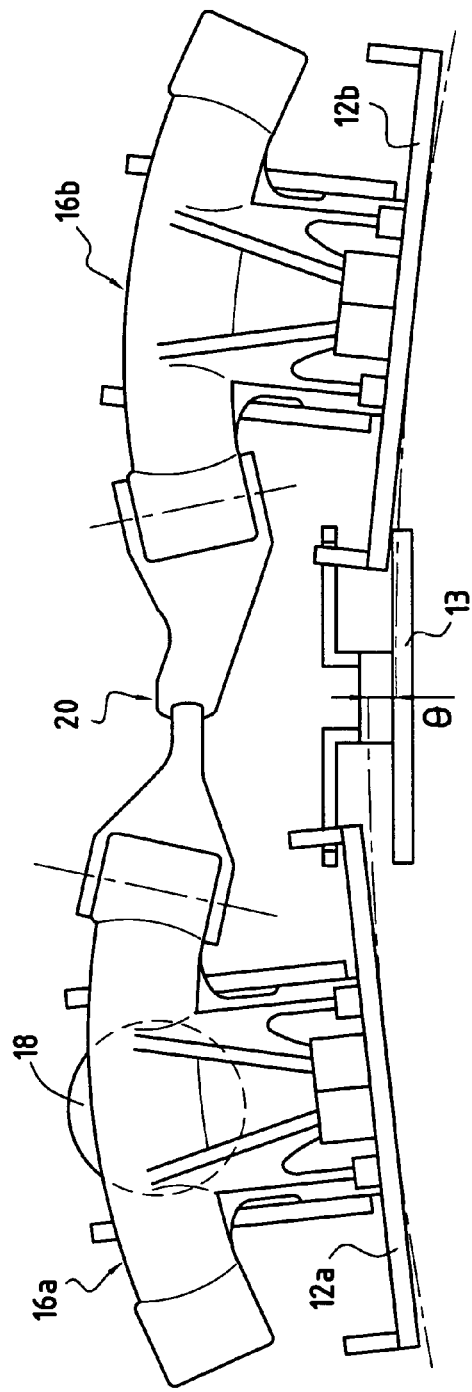
FIG. 2 is a fragmentary front view of the FIG. 1 nozzle when at rest.

FIGS. 1 and 2 are different views of the nozzle 10 as described above while it is in a rest state (i.e. while it is not in operation). In such a state, the flaps 12b associated with the following control levers 16b present a radial offset θ (FIG. 2) relative to the flaps 12a associated with the control levers 16a.

More precisely, when the nozzle is at rest at shown in the example of FIGS. 1 and 2, the flaps 12b associated with their follower control levers 16b are radially offset by an amount θ relative to the other flaps 12a in a direction that is directed towards the inside of the nozzle 10.

In other words, when the nozzle is at rest, the flaps 12b associated with the follower control levers 16b lie on a diameter that is smaller than the diameter on which the flaps 12a associated with the control levers 16a lie.

Furthermore, it can be observed that the follower flaps 13 disposed between the adjacent flaps 12a and 12b shown in these FIGS. 1 and 2 bears solely against the flap 12b associated with the follower control lever 16b. This is due to the fact that this flap 12b is situated on a diameter that is smaller than that on which the adjacent flap 12a is situated.

Figure 3:
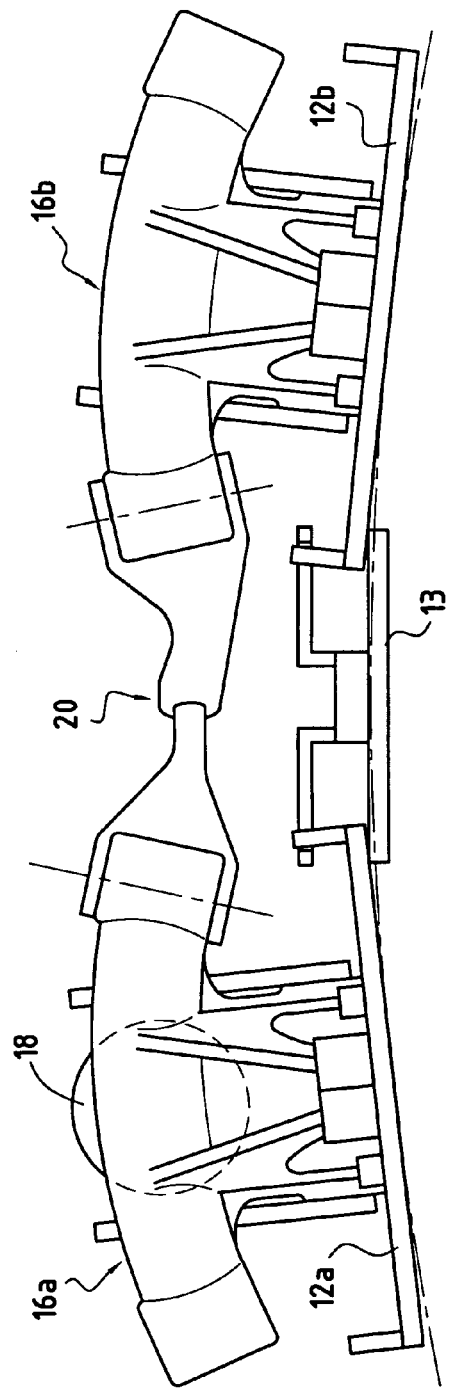
FIG. 3 is a fragmentary front view of the FIG. 1 nozzle in operation at full speed.

FIG. 3 is a face view of the nozzle 10 while in operation (where such operation may correspond to operation at "full throttle").

In this figure, it can be seen that the radial offset between the flaps 12b associated with the follower control levers 16b and the flaps 12a associated with the controlled levers 16a has disappeared. The adjacent flaps 12a and 12b in FIG. 3 lie on the same diameter, and the follower flap 13 then bears against both the flap 12a and the flap 12b. As a result any risk of leakage between the adjacent flaps is avoided.

The idea of introducing a radial offset θ between the various flaps of the nozzle depending on whether they are associated with follower levers 16b or controlled levers 16a stems from a study of the dynamic behavior of the nozzle.

In particular, it has been found that the forces and the directions in which they are taken up by the control lever supports 22 are not the same for flaps 12a that are associated with controlled levers 16a and for flaps 12b that are associated with follower levers 16b. In addition, the dynamic behavior (i.e. the deformation of the parts) is reduced by not having any forces taken up by the follower levers 16b.

A consequence of these differences is that the clearances are not taken up in the same manner by flaps 12a associated with the controlled levers 16a and flaps 12b associated with follower levers 16b.

In addition, given that during operation of the nozzle the control lever supports 22 and the casing 14 do not deform in the same manner, depending on whether or not they include an actuator, an offset arises in the vicinity of the spools 24.

Finally, the deformation of the linkage (i.e. of the control levers 16a, 16b and of the transmission links 20) differs between follower levers 16b and controlled levers 16a.

All of these different observations have led to the conclusions that without a radial offset when the nozzle is at rest, the flaps 12b of the nozzle that are associated with the follower levers 16b are to be found in operation on a diameter that is greater than the diameter on which the flaps 12a that are associated with the controlled levers 16a are to be found, thereby leading to an offset between adjacent flaps and thus to leakage.

The radial offset θ applied to the flaps 12b of the nozzle that are associated with follower levers 16b is determined in such a manner that in operation the flaps 12b of the nozzle lie on the same diameter as the flaps 12a that are associated with the controlled levers 16a. By way of example, such a radial offset may be of the order of about 10 millimeters (mm) to about 15 mm.

Figure 4:
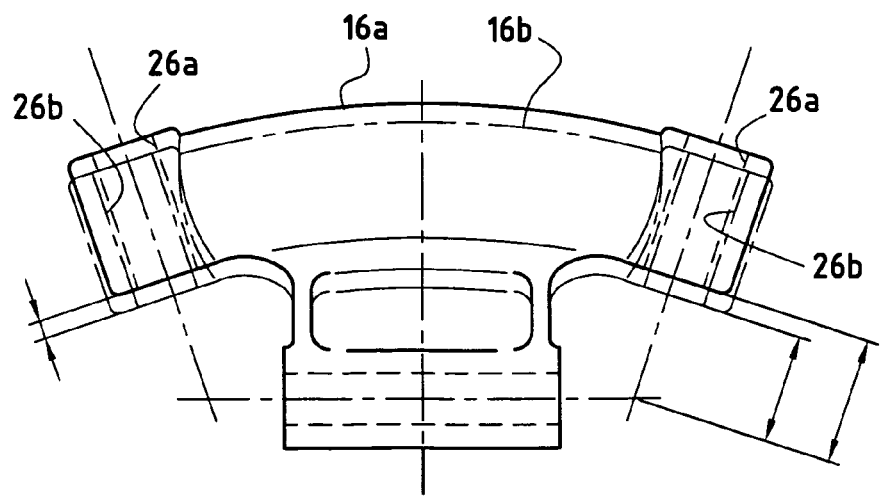
FIG. 4 is a cross-section view of a follower control lever in a nozzle of the invention.

According to an advantageous characteristic of the invention, as shown in FIG. 4, the radial offset θ of the flaps 12b associated with the follower control levers 16b is achieved by changing the way in which the follower levers 16b are machined.

FIG. 4 shows a controlled lever 16a (in continuous lines) and a follower lever 16b (in dashed lines). These control levers 16a and 16b are provided at their circumferential ends with radial orifices 26a and 26b for fastening to the swivel forks that form the transmission links.

These orifices 26a and 26b are machined differently in controlled levers and in follower levers as to confer the required radial offset to the flaps associated with the follower levers.

In FIG. 4, it can clearly be seen that the orifices 26b of the follower lever 16b are machined in a manner that is offset radially towards the inside of the nozzle compared with the way in which the orifices 16a of the controlled lever 16a are machined. Such an offset in the machining of the orifices 26a and 26b suffices to establish a radial offset towards the inside of the nozzle between the flaps 12a and 12b.

Making the radial offset θ between the flaps 12a and 12b by modifying the machining of the follower levers 16b is an operation that is simple and inexpensive and that presents the advantage of not requiring other parts of the nozzle to be modified. Furthermore, very little modification is applied to the levers: the main bodies of the levers remains the same both for the follower levers and for the controlled levers.

What is claimed is:

1. A variable-section nozzle for a turbomachine, said nozzle comprising:
   a plurality of movable flaps that form a ring,
   a flap control system comprising control levers each associated with a respective movable flap, the control levers comprising both controlled levers that are actuated directly by actuators, and follower levers that are actuated by the controlled levers via transmission links,
   wherein, when the turbomachine is not running such that no exhaust stream passes through the ring formed by the movable flaps, the flaps associated with the follower levers present a radial offset relative to the flaps associated with controlled levers.

2. A nozzle according to claim 1, wherein, when the turbomachine is not running such that no exhaust stream passes through said ring the movable flaps associated with the follower levers present a radial offset towards the inside of the nozzle relative to the movable flaps associated with the controlled levers.

3. A nozzle according to claim 1, wherein the radial offset of the movable flaps associated with the follower levers corresponds to a structural difference between said controlled levers and said follower levers and not to a structural difference between the flaps.

4. A nozzle according to claim 1, wherein the control system for the movable flaps comprises as many controlled levers as follower levers.

5. A turbomachine, including a variable-section nozzle according to claim 1.

6. A nozzle according to claim 1, wherein, when the turbomachine is running at full throttle, said flap control system controls said movable flaps such that said radial offset is zero.

7. A nozzle according to claim 6, wherein said movable flaps include follower flaps, each follower flap being between a flap associated with a follower lever and a flap associated with a controlled lever.

8. A nozzle according to claim 7, wherein, when the turbomachine is not running such that no exhaust stream passes through said ring, each of said follower flaps bears solely against an adjacent flap associated with a follower lever and does not bear against an adjacent flap associated with a controlled lever.

9. A nozzle according to claim 8, wherein, when the turbomachine is running at full throttle, each of said follower flaps bears against said adjacent flap associated with a follower lever and against said adjacent flap associated with a controlled lever.

10. A nozzle according to claim 1, wherein each of said controlled lever and of said follower levers defines circumferential ends with radial orifices for fastening the control levers to said transmission links, and wherein the radial orifices of said follower levers are offset by a radial offset relative to the radial orifices of said controlled levers.

11. A nozzle according to claim 10, wherein said radial offset corresponds to a structural difference between said follower levers and said controlled levers, said structural difference resulting from a difference in machining said followers levers relative to machining said controlled levers.

\* \* \* \* \*